Figure 1:
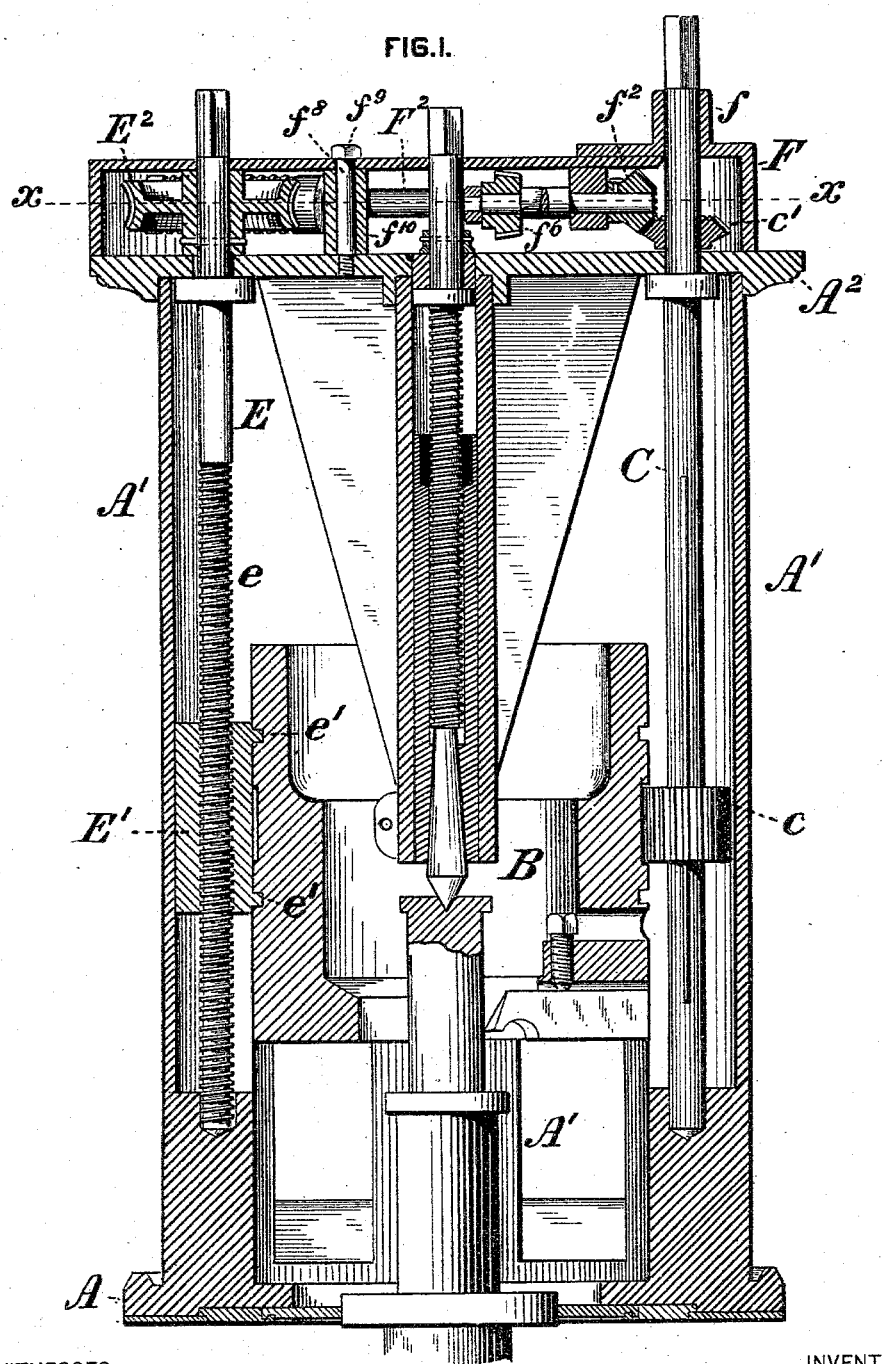

(No Model.)

D. W. PEDRICK.
MACHINE FOR TURNING AND BORING.

No. 288,953. Patented Nov. 20, 1883.

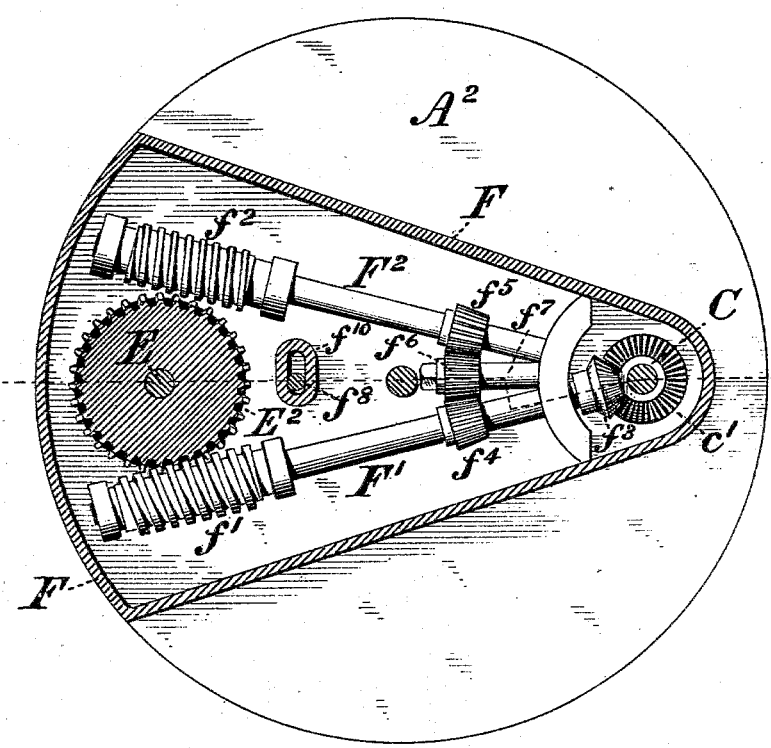

UNITED STATES PATENT OFFICE.

DANIEL W. PEDRICK, OF PHILADELPHIA, PENNSYLVANIA.

MACHINE FOR TURNING AND BORING.

SPECIFICATION forming part of Letters Patent No. 288,953, dated November 20, 1883.

Application filed June 15, 1883. (No model.)

*To all whom it may concern:*

Be it known that I, DANIEL W. PEDRICK, of the city and county of Philadelphia, in the State of Pennsylvania, have invented certain new and useful Improvements in Machines for Turning and Boring Metal, of which improvements the following is a specification.

My invention is an improvement upon that for which Letters Patent of the United States No. 188,008, were granted and issued to Lucian B. Flanders, under date of March 6, 1877; and its object is to simplify and perfect the construction and operation of the mechanism by which the required longitudinal feed is imparted to the tool-carrying cylinder and cutting-tool in machines of the character of that set forth in said Letters Patent.

To this end my improvements consist in a casing for covering and protecting the feed-gearing having a series of feed-gears mounted thereon, and adapted to be vibrated about the axis of the driving-shaft of a turning and boring machine, and to be connected to and disconnected from said machine at pleasure; also, in the combination of a casing for covering and protecting the feed-gearing, a socket or bearing thereon adapted to fit around the driving-shaft of a turning and boring machine, feed-gearing mounted in bearings in said casing, and a clamping-screw for fixing the casing relatively to the feed-shaft of the machine; also, in the combination of a casing for covering and protecting the feed-gearing, a pair of feed-shafts mounted in bearings thereon and relatively inclined, an intermediate shaft carrying a gear, which meshes with similar gears on the feed-shafts, a gear secured to one of said shafts, and adapted to mesh with a gear upon the driving-shaft of a turning and boring machine, and worms secured upon the feed-shafts, either of said worms being adapted to engage with or both to be disengaged from a worm-wheel on the feed-shaft of the machine.

The improvements claimed are hereinafter more fully set forth.

In the accompanying drawings, Figure 1 is a vertical central section through a machine for turning crank-pins and boring out holes therefor embodying my invention, and Fig. 2 is a horizontal section through the same at the line $x\,x$ of Fig. 1.

My improvements are herein shown and will be described as applied to a machine which is in all particulars, saving as to the feed mechanism, substantially similar to that of Letters Patent No. 188,008 aforesaid, to which reference may be had for such detailed description as may be desired of the features of its mechanism, which do not constitute part of my present invention. The base-ring A of the machine carries a series of columns, A', to which is secured the cap-plate A², and which serve as guides or bearings for the traverse of the tool-carrying cylinder B, said cylinder, with its attached boring or turning tool or tools, as the case may be, being rotated by the application of power to the driving-shaft C, which is mounted in bearings in the base and cap plates, and carries, upon a key or feather, a spur-pinion, c, which meshes with a corresponding gear on the periphery of the cylinder B. The apparatus is secured upon the work, so that the tool-carrying cylinder shall be concentric therewith, by chuck-jaws D and clamps of any approved construction. The longitudinal feed is, as in Letters Patent No. 188,008 aforesaid, imparted automatically to the tool-carrying cylinder from the driving-shaft through a feed-shaft, E, upon which is formed a feed-screw, $e$, which engages a nut, E', having projections $e'$, which enter circumferential grooves in the tool-carrying cylinder. Rotation is imparted to the feed-shaft in one or the other direction, as required, by the improvements which constitute my invention, the construction and operation of which is as follows: A casing, F, for covering and protecting the feed-gearing of substantially sectoral outline in plan, having an open bottom and a closed top, is fitted to rest upon the cap-plate A² of the machine, with which it makes a close joint at bottom, so as to protect the inclosed gearing from the access of dust and other foreign matters. A socket or bearing, $f$, formed upon the top of the casing F, fits around the driving-shaft C, about the axis of which the casing is thus adapted to be vibrated. A pair of worm-shafts, F' F², upon which are formed or secured, respectively, the worms $f'$ $f^2$, are mounted in bearings connected to the upper plate of the casing, the axial lines of said shafts passing through the axis of the driving-shaft C, and thence diverging or being inclined one to the other at such an angle as will, when the casing is moved into such position that its longitudinal center line intersects the axis of the feed-shaft, enable both the worms $f'$ $f^2$ to be rotated entirely clear of a worm-wheel, $E^2$, secured upon the upper end of the feed-shaft in line with the axes of the worm-shafts. A bevel-pinion, $f^3$, upon one of the worm-shafts, $F'$, meshes with a similar pinion, $c'$, upon the driving-shaft C, and pinions $f^4$ $f^5$ upon the worm-shafts $F'$ $F^2$, respectively. Each engages a pinion, $f^6$, upon an intermediate or idler shaft, $f^7$, mounted in a bearing beneath the top plate of the casing. A clamping-stud, $f^8$, is secured to the cap-plate $A^2$, and passes through a vertically-slotted clamping-block, $f^{10}$, thereon, and a nut, $f^9$, engaging a screw-thread on the upper end of the stud $f^8$, serves to hold the casing in desired position by clamping the upper plate thereof between its lower face and the block $f^{10}$, when screwed to a proper bearing upon said upper plate. It will be obvious that by releasing the nut $f^9$ the feed-casing and its attached gearing may be readily removed from the machine when required.

In operation the casing F is swung about the axis of the driving-shaft C until one or the other of the worms $f'$ $f^2$ is brought into gear with the worm-wheel $E^2$, according to the direction in which it is desired to rotate the feed-shaft, and being then fixed in such position by the clamping-nut $f^9$, the feed-shaft will consequently be continuously rotated during the revolution of the driving-shaft. At the termination of the required traverse of the tool-carrying cylinder, the nut $f^9$ is slackened and the casing moved into and secured in position to engage the opposite worm with the worm-wheel, in order to effect the traverse of the tool-carrying cylinder in the opposite direction. When moved into central position, neither of the worms will be in gear with the worm-wheel, and no rotation will be imparted to the feed-shaft, which, under such circumstances, may be moved by hand in either direction by the application of a crank or wrench to a squared bearing upon its upper end.

I claim as my invention and desire to secure by Letters Patent—

1. In a turning and boring machine, the combination, substantially as set forth, of a casing for covering and protecting the feed-gearing resting on and movable upon the cap-plate of said machine about the axis of the driving-shaft thereof, and feed-gearing carried by said casing and adapted to impart rotation from the driving-shaft to the feed-shaft.

2. In a turning and boring machine, the combination, substantially as set forth, of a casing for covering and protecting the feed-gearing resting on the cap-plate of said machine, and having a socket or bearing fitting around the driving-shaft, feed-gearing mounted upon said casing, and adapted to impart rotation in either direction from the driving-shaft to the feed-shaft, and a clamping device for securing the casing in desired position upon the cap-plate.

3. The combination, substantially as set forth, of a casing for covering and protecting the feed-gearing, a pair of relatively-inclined feed-shafts mounted in bearings thereon, each carrying a worm adapted to mesh with a worm-wheel in the feed-shaft of a turning and boring machine, an intermediate shaft carrying a gear meshing with gears upon the feed-shafts of the casing, and a gear secured upon one of said shafts and adapted to mesh with a gear upon the driving-shaft of a turning and boring machine.

DANIEL W. PEDRICK.

Witnesses:
J. SNOWDEN BELL,
H. C. AYER.